Oct. 19, 1965 J. R. FEATHERSTON 3,213,370
SIGNAL SELECTING SYSTEM WITH SWITCHING AT THE INTERSTICE BETWEEN DATA INCREMENTS
Filed March 13, 1961
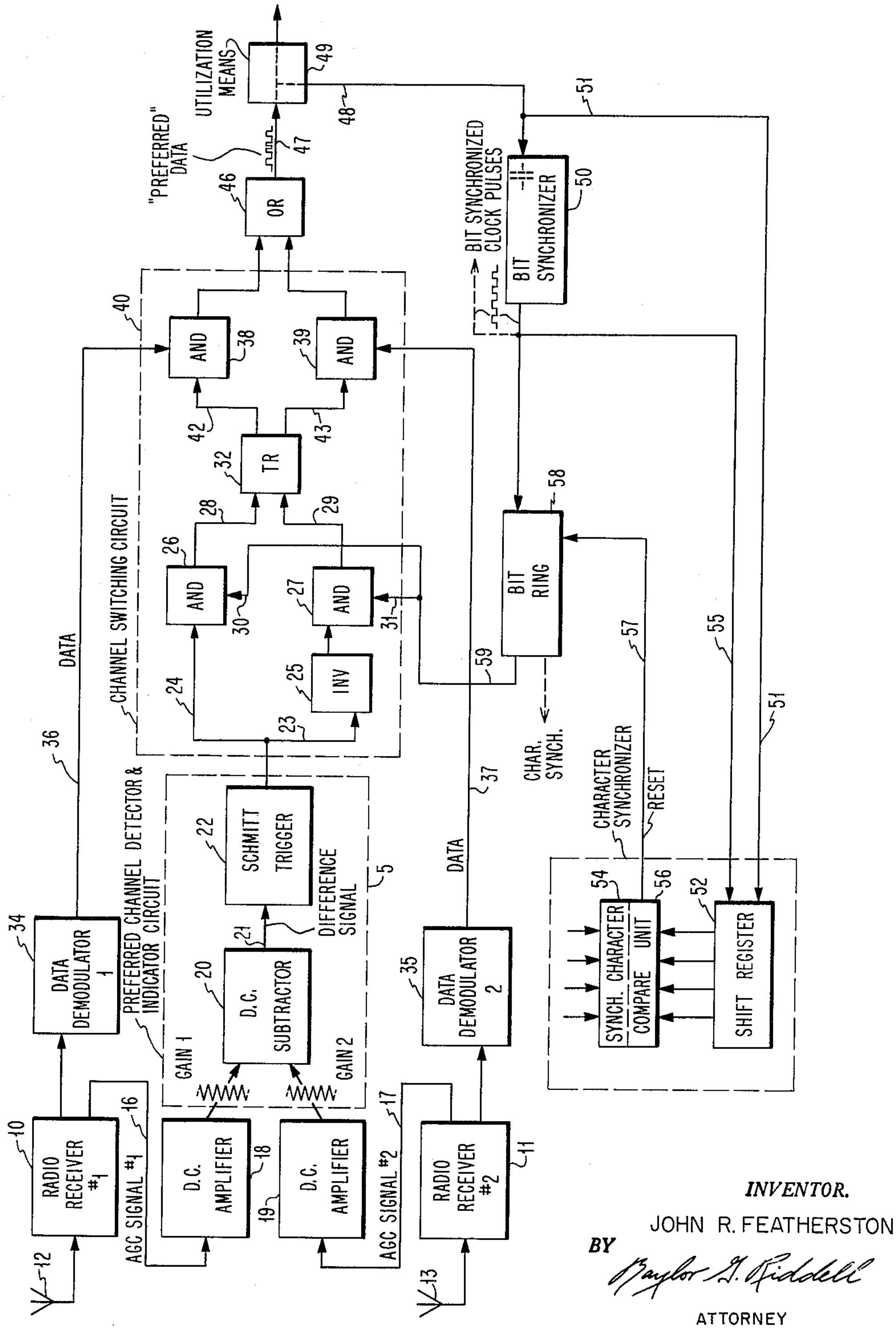
*INVENTOR.*
JOHN R. FEATHERSTON
BY Baylor G. Riddell
ATTORNEY 3,213,370

SIGNAL SELECTING SYSTEM WITH SWITCHING AT THE INTERSTICE BETWEEN DATA INCREMENTS

John R. Featherston, Tucson, Ariz., assignor to International Business Machines Corporation, New York, N.Y., a corporation of New York Filed Mar. 13, 1961, Ser. No. 95,332
7 Claims. (Cl. 325—304)

This invention relates to a signal switching system monitoring the same data appearing on a plurality of channels to detect, identify and switch to the channel with the best received signal. More particularly the invention relates to such a system wherein the switching is under control of the content or intelligence structure of the data thereby limiting switching to appropriate times compatible therewith. The invention is particularly useful, although not limited to diversity radio reception systems.

In the transmission and reception of radio signals, for example, atmospheric and ionospheric conditions cause variations in the quality of the signals received, such as their amplitude. The signal reception may even momentarily fail completely. The degree to which this problem can be solved by improvements in the equipment, such as increasing transmitter power, reaches a point of diminishing return considerably before completely error-free reception is achieved. In the past, two receivers spaced some distance apart (or with antennas arranged in cross polarization with respect to one another) and tuned to the same incoming signal have been used in conjunction with means for comparing their signal quality. With the comparing means arranged to automatically switch between the signals to utilize the better one a marked improvement in signal reliability has been accomplished since likelihood of both signals becoming unsatisfactory simultaneously is considerably remote. These systems have been called "diversity reception systems."

In these systems, the comparing and switching means has usually been activated in response to signal quality alone, and in some instances, the act of switching produces spurious pulses known as switching "transients." One result, then, of switching between receivers based solely on the physical signal, e.g. its amplitude, is that switching occurs at any time and irrespective of the intelligence being received. Thus, a switching transient appearing in the middle of a coded word or character might insert an erroneous "bit" of the code thereby producing an information error. Thus, diversity reception of coded data has always had the problem of loss of data due to the introduction of switching transients.

In the prior art, this was not too objectionable because the data rate was relatively slow as in telegraphy and speech transmission. Furthermore, the context of the message could usually provide a reliable check against information errors. However, with the considerable increase in data rates required for present day data processing needs, diversity reception becomes less and less feasible using the old system since such transients can too easily cause errors which the receiving equipment is not able to detect, i.e. as distinguishing between a transient and a data "bit."

Therefore, it is an object of the invention to provide an improved electric signal channel monitoring and selecting system and a more particular object to avoid transmission errors in multi-channel monitoring systems caused by switching transients.

Another object of this invention is the provision of means to select an appropriate time to switch from one channel to the other based on the content of the intelligence itself as well as upon the quality of the signal received. A further object is the provision of a diversity radio reception system wherein channel selection is controlled by the conjoint detection of both a signal of preferred quality and a timely switching moment based on an auditing of the intelligence.

Accordingly, in the present diversity receiving system having a signal comparing means arranged to switch receivers to select the better incoming signal switching between channels is under control of the data structure of the intelligence received so that switching to a preferred channel occurs at times least likely to generate information errors.

Thus, another object of the invention is the provision of a diversity receiving system wherein the channel switching means is responsive to the intelligence transmitted, thereby avoiding the insertion of switching transients within the intelligence.

These and other objects, features and advantages of the invention will be apparent from the following more particular description of a preferred embodiment of the invention, as illustrated in the accompanying drawing.

In the single figure of the drawing, a diversity receiving system is shown utilizing my invention.

Briefly stated, the system includes a pair of radio signal receivers, the A.G.C. output of which provides an indication of signal quality. This A.G.C. output is D.C. amplified to a subtractor coupled to both receivers. The subtractor accepts the A.G.C. voltage from the two receivers, detects their difference, and generates a voltage proportionately greater or less than a given reference voltage established by zero difference in the signals. This reference voltage lies midway between the limits of the "backlash" of a Schmitt trigger connected to the subtractor output. When the subtractor output exceeds the upper limit of the backlash, i.e. the switch ON voltage, the Schmitt indicates that one channel is enough better than the other so as to indicate a need to switch to it. When the difference signal falls below the lower limit of the backlash, i.e. the switching OFF voltage of the Schmitt, its output indicates that the latter channel should be used. Thus, the amplitude difference signal attempts to set the Schmitt trigger, while the backlash limits switching to only those signal difference which are significant. This backlash can be adjusted easily, of course, within a wide range.

A second trigger such as an Eccles-Jordan flip-flop is provided and "set" by the combined action of (1) the Schmitt trigger when it indicates a significantly better signal on the inactive channel and (2) a decision pulse indicative of a propitious moment in the intelligence for switching. As an example, a code with sixteen "bits" per character is used herein for illustrative purposes. Each character uses only fifteen of the "bits" and the sixteenth bit position is a blank or space. Therefore, switching is confined to the time following the fifteenth bit and preceding the first bit of the next character. In this exemplary arrangement, the "decision pulse" circuitry which examines the intelligence or data to determine the proper moment for switching to the preferred channel is located downstream from the second trigger. The output of the decision circuitry, as thus responsive to the intelligence, is fed back to control the Eccles-Jordan flip-flop conjointly with the output of the preferred channel indicator. Thus, the state of the second trigger (controlling the activation of one data channel and the deactivation of the other) can be changed only at decision time to determine which of two data channels are to be utilized for the next character. Consequently, all the switching operations are forced to occur at idle instants between characters where they cannot alter the "bit" pattern within a character.

While the present embodiment has chosen to switch between characters, other increments of data such as words, phrases, or even between each bit can be selected as appropriate for switching if desired. Also, in teletype data transmission using "start-stop" data detection employing for example the so-called 7½-bit mark-space code switching can be limited to an appropriate period compatible with the code.

Furthermore, while the present embodiment relies upon the criteria of amplitude variations in the incoming signal as a basis to determine signal quality, other criteria can be used. For example, the percentage of errors in the received signal could indicate a signal of unsuitable quality. Or other channel parameters could be used such as the rate of fading of the signal, its noise level, or the multipath spread characteristic of signals received via two paths. These all provide a measure of performance of the signals received and herein this has merely been called "quality." Thus, signal comparing means relates to the comparison of signal quality in this broader sense.

It should also be understood that the transition in signal quality occurs over a long enough period that delaying switching to an appropriate moment compatible with the intelligence content does not cause a loss of data.

With reference to the drawing, two radio receivers 10 and 11 receive signals containing the same intelligence, for example, as from a common broadcasting station (not shown) via antennas 12 and 13 respectively. The term "radio" is here used in its broad sense and not limited so as to exclude television and microwave signals. Antennas 12 and 13 are spaced a substantial distance apart, e.g. 1000 ft., or are in polarization quadrature with each other. The A.G.C. output of each receiver connects via leads 16 and 17 respectively to suitable D.C. amplifiers 18 and 19 which amplify the A.G.C. signals which are indicative fo received signal quality. These signals are then directed to a "preferred channel detecting and indicating circuit" 5. Specifically, they are directed to suitable D.C. subtractor circuit 20, such as a difference amplifier, for example as shown in FIGS. 1–16 of the book entitled Pulse and Digital Circuits by Millman and Taub, McGraw-Hill, 1956. The signal from amplifier 18 is used as the value "$e_2$" in the reference and the signal from amplifier 19 is used for "$e_1$." If no voltage difference exists, subtractor 20 generates an output voltage at a predetermined reference level or index midway between the the upper and lower limit of the "backlash" of a Schmitt trigger 22 coupled thereto. If the output from amplifier 18 is greater than from 19 then the difference is proportionately amplified and the subtractor output rises above the reference level. If the signal from amplifier 19 is preferable to that from amplifier 18, the output from subtractor 20 drops below the reference level. Subtractor 20 connects via lead 21 to control a Schmitt trigger 22 such as the one shown and described in Section 5–10 of the above reference. As noted therein, this circuit exhibits hysteresis or "backlash" (page 166) which is defined as the difference between the values of voltage at which triggering occurs dependent upon whether the controlling level is increasing or decreasing. In circuit 22 this backlash has been adjusted to provide a sufficient enough spread between the switching ON voltage and the switching OFF voltage so that an indication of the need to change channels is given only where a significant difference between received signals exists.

The output from circuit 22 taken for example from point $P_2$ in FIGS. 5–17 of the above reference is applied to two output leads 23 and 24. Lead 24 connects directly to an AND circuit 26 while lead 23 connects to an inverter 25 and then to an AND circuit 27. Since the output of the Schmitt circuit 22 will be one of two bistable voltage levels, one relatively higher than the other, this higher value will be applied to AND circuit 26 and at the same time, due to the action of inverter 25, the lower value will be applied to AND circuit 27. When the Schmitt switches OFF the reverse will be true. Thus, the output of the Schmitt trigger will be represented by either a relatively high voltage level on lead 24 and a relatively low voltage level from inverter 25 or vice versa, and these conditions will alternately exist for each subsequent switching of circuit 22. Both AND circuits 26 and 27 provide a pulse on their respective output leads 28 and 29 under action of the coincident existence of a relatively high voltage level on each of two inputs applied to them. As noted above, one of these inputs is provided either by lead 24 or inverter 25. The other input is provided via a positive pulse subsequently to be referred to as a "decision" pulse, on leads 30 and 31. Thus, only one of circuits 26 and 27 can ever receive the coincident application of two positive inputs.

The generation of a "decision" pulse to be applied to AND circuits 26 and 27 may be done in any suitable manner appropriate to the requirements of a specific application and ordinarily may be expected to exist as a function generated within the using system such as utilization means 49. In the present instance, as noted above a 16-bit code is used and switching is confined to the time between characters. The circuitry for accomplishing this result will be described below. Suffice it to say for the moment that such a "decision" pulse can be generated and applied to circuits 26 and 27.

Referring to receivers 10 and 11, their modulated output is fed to suitable demodulating devices 34 and 35 which extract the data signals. The data signals, in the form of pulses providing one of two voltage levels, are then applied via leads 36 and 37 respectively to AND circuits 38 and 39 respectively, comprising part of the channel switching circuitry 40.

In the present instance, it has been arbitrarily arranged to use a positive going pulse for the "decision" pulse and the coincident existence of two such pulses at either circuit 26 or 27 produces a negative pulse output. This negative output is desirable since the trigger circuit 32 which follows is preferably operated by a negative pulse rather than a positive pulse. Circuit 32 may be any bistable element such as an Eccles-Jordan circuit having two opposite binary stable states such as shown for example in FIG. 5–1 of the above reference. In the present system circuit 32 is arranged for unsymmetrical triggering, i.e. the triggering signal is effective in inducing a transition in only one direction. A second triggering signal from a separate source must be introduced in a different manner to achieve the reverse transition. More specifically, lead 28 is arranged to apply any negative pulse thereon to the grid of one tube in the circuit 32 and the resultant output is taken from the plate of this tube on lead 42. In this manner, the output on lead 42 is a positive pulse. Similarly, lead 29 is arranged to apply any negative pulse thereon to the grid of the other tube in circuit 32 and the resultant output appears on lead 43 likewise providing an inversion of the input. As noted above, it is assumed in the present arrangement that data pulses will be represented by binary voltage levels appearing on conductors 36 and 37. Therefore, since one of leads 42 and 43 is always at the upper of two voltage levels, one of AND circuit 38 and 39 will block incoming data received while the other will pass such data to a conventional OR circuit 36. Therefore, the output from OR circuit 46 represents the data transmitted on the preferred channel, i.e, either 36 or 37. One possible alternative arrangement might be to use only one data demodulating unit located immediately following OR circuit 46 and removing those shown in the drawing, 34, 35.

In the present arrangement and using the 16-bit code example, the appropriate moment for switching can be generated in several ways. While ordinarly the utilization equipment or means 49 receiving the preferred data from OR circuit 46 will include means for indicating an appropriate moment for switching, one such arrangement has been shown in the lower portion of the drawing. In the example, two requirements exist. The first is that a series of timing or "clock" pulses must be synchronized with the bit rate of the data received. The other is the determination of the moment between the fifteenth bit of one character and the first bit of the following character so that after identifying the beginning of one character, it becomes a simple matter to count a predetermined number of the clock pulses and generate an output or "decision" pulse in time with an interstice between characters.

The above objective is accomplished by connecting the output lead 47 or OR circuit 46 via conductor 48 to a bit synchronizer circuit 50 such as, for example, a free-running multivibrator with a capacitance input to accept an appropriate spike for re-setting the multivibrator in phase with the "preferred" data appearing on line 47. An alternative arrangement for circuit 50 capable of generating a series of clock pulses in phase with the data is shown in FIG. 1 of U.S. 2,864,078. Lead 47 is also connected via conductor 48 and a conductor 51 to a suitable shift register 52. Shift register 52 is also coupled to the output from synchronizer 50 via lead 55 so as to receive a series of clock pulses which are in phase with the data rate. The data therefore steps its way through the shift register 52 under control of the output from bit synchronizer 50. An address or character synchronizing register 54 is conditioned with a predetermined unique character which appears at appropriate intervals in the broadcast received. Register 54 is coupled to a comparing unit 56 so that when the unique character is received in the system, it will be recognized by a comparison between the condition of the register 54 and shift register 52. The resultant comparison generates a reset pulse on lead 57 connected to a conventional ring or predetermined counter 58 arranged to generate a single output pulse for each sixteen input pulses counted. Counter 58 is directly connected to the output from synchronizer 50 so as to receive the clock pulses therefrom. Thus, a decision pulse which is in phase with the data rate and which recognizes an appropriate moment for switching, namely between characters, has been provided to control AND circuits 26 and 27.

*Operation*

In operation, a modulated radio signal is received on antennas 12 and 13. The same data is contained in both signals. The A.G.C. output of receivers 10 and 11 is D.C. amplified by circuits 18 and 19 respectively and fed to D.C. subtractor 20. Subtractor 20 generates a proportional difference signal which will vary above and below an established reference voltage depending upon whether the signal on the upper channel is better or worse than that of the lower channel. When the upper channel has a signal of greater amplitude than the signal on the lower channel, the output of subtractor 20 will rise above the reference level. The subtractor output will, however, very below the reference voltage if the reverse is true.

If it is assumed that the signal via receiver 10 is becoming better than the signal via receiver 11, when the voltage output on lead 21 exceeds the upper limit of the blacklash of Schmitt trigger 22, trigger 22 is turned ON, i.e. it provides a relatively voltage output. With trigger 22 ON, a decision pulse applied to conductors 30 and 31 will activate AND circuit 26 thereby applying a negative pulse to lead 28. The negative pulse on lead 28 switches the Eccles-Jordan circuit 32 to generate a positive step on lead 42 which enters AND circuit 38. The incoming signals via receiver 10 are concurrently being demodulated by unit 34 to extract the "pure" data for application to AND circuit 38 via lead 36. Thus the coincident existence of two relatively positive voltage levels will exist on inputs to circuit 38 to provide an output to line 47 via OR circuit 46. This output represents the "preferred channel" data.

At the same time that data from lead 36 was being utilized, data on lead 37 was being blocked by AND circuit 39, since the ON condition of the Schmitt trigger had been converted to a relatively low voltage condition applied to AND circuit 27. Correspondingly, the voltage level on lead 29 from AND circuit 27 is at the upper of two voltage values and is therefore ineffective with respect to controlling trigger 32. Consequently, lead 43 is de-ativated when a relatively positive voltage appears on lead 42 thereby preventing AND circuit 39 from functioning.

In order to appropriately synchronize the decision pulse with the interstice between characters the data from the preferred channel is applied to a bit synchronizer 50 which generates a series of clock pulses synchronized with the bit timing rate of the data. The preferred channel data is also applied via lead 51 to a shift register under control (via lead 55) of the clock pulses so generated. Comparison unit 56 continoousIy monitors the condition of the shift register 52 with respect to the condition of register 54 to detect the receipt of a unique character. Upon making such a comparison, a reset pulse is generated on line 57 leading to counter 58 which is effective to reset counter 58. Counter 58 then commences counting the clock pulses from synchronizer 50 and every sixteenth pulse counted generates an output pulse on line 59.

When the signal at receiver 11 is significantly better than the signal at receiver 10, the voltage level output on line 21 from subtractor 20 decreases below the lower limit of the backlash of Schmitt trigger 22 effectively conditioning it to its OFF condition. This lowers the voltage on lines 23 and 24 so that inverter 25 generates a raised voltage applied to AND circuit 27. Therefore, when a decision pulse appears on line 59, AND circuit 27 supplies a negative output pulse to trigger 32. This negative pulse is converted to a positive step on line 43 so that the data on line 37 passes to OR circuit 46. At the same time, line 42 is deactivated and data on line 36 is blocked by AND circuit 38.

While the invention has been particularly shown and described with reference to a preferred embodiment thereof, it will be understood by those skilled in the art that changes in the form and details may be made therein without departing from the spirit and scope of the invention. For example, while the receivers 10 and 11 have been shown as arranged in space diversity with respect to one another, it is within the contemplation of this invention that the two receiver channels could be monitoring like data transmitted via signals of different frequencies. Likewise, while amplitude variations in the signals have been shown as providing the criteria upon which selection of the better signal is based, it is entirely possible that by appropriate monitoring, the percentage of errors in the received signals of each channel could be utilized as the criteria upon which to base switching. Any measure of the performance of each channel could be used, for example, minimum multipath spread as evidenced and detected by a measurement of interbit interference or bit elongation present in the received signal of that channel. The decision pulse could be by suitable means made responsive to the interstice between words or bits or at any other appropriate or suitable moments in the data structure. Furthermore, it is to be understood that while radio receivers have been shown in the above arrangement, the invention applies equally to any apparatus for monitoring signals containing the same intelligence and selecting one of the monitoring channels based upon the conjoint consideration of the nature of the signal and its intelligence content. Therefore, it is my intention to be limited only according to the scope of the following claims.

What is claimed is:

1. In a diversity radio receiving system for spaced data signals, the system including a generator operable to generate a series of uniquely defined pulses during each data signal period and during the space period, a pair of data signal channels, means having an output by which the channel having a preferable signal is identified and means to provide connection between the identified channel and utilization means, channel switching delay means comprising:

means operable to store the output of the preferable channel identification means; and means responsive to the pulse generated by the generator during the space period and the output of said storage means to energize the connecting means.

2. A switching system operative to pass a signal consisting of spaced groups of information, comprising:

a plurality of channels on each of which the signal is impressed;

means to identify a preferable channel;

means to identify the space between groups of information in the signal;

utilization means; and means responsive to said channel identification means and to said space identifying means to connect said utilization means to said preferable channel.

3. A switching system operative to pass a signal consisting of spaced groups of information comprising:

a plurality of channels on each of which the signal is impressed;

a comparator responsive to the signals on said channels and capable of generating a signal indicative of a preferable channel;

a generator responsive to the signal on at least one of said channels and capable of emitting a signal indicative of the space between groups of information; and a gate responsive to the signals on said channels and to the signals of said comparator and said generator to pass the signal of the preferable channel.

4. The combination of claim 3 and utilization means responsive to the signal passed by said gate.

5. The combination of claim 3 in which said comparator comprises:

a subtractor responsive to the signals on said channels to provide a difference signal; and a trigger circuit responsive to the difference signal of said subtractor to provide the signal indicative of the preferable channel.

6. The combination of claim 5 in which said gate comprises:

a flip-flop circuit responsive to the signals of said trigger circuit and said generator to provide a composite signal;

a gate network responsive to the composite signal of said flip-flop circuit and to the signals on said channels to provide an output signal; and utilization means responsive to the output signal of said gate network.

7. The combination of claim 5 in which said trigger circuit is characterized by differential input triggering whereby the signal indicative of the preferable channel is generated only if the difference signal from said subtractor exceeds a predetermined amplitude.

References Cited by the Examiner

UNITED STATES PATENTS

| | | | |
|---|---|---|---|
| 2,383,126 | 8/45 | Hollingsworth | 325—304 |
| 2,927,965 | 3/60 | Waer | 179—15 |

OTHER REFERENCES

Griffiths et al.: Wireless World, November 1949, pages 414–418.

DAVID G. REDINBAUGH, *Primary Examiner.*

SAMUEL B. PRITCHARD, STEPHEN W. CAPELLI, *Examiners.*